US010657166B2

(12) United States Patent
Gorzela et al.

(10) Patent No.: US 10,657,166 B2
(45) Date of Patent: *May 19, 2020

(54) REAL-TIME SENTIMENT ANALYSIS FOR CONFLICT MITIGATION USING COGNATIVE ANALYTICS AND IDENTIFIERS

(71) Applicant: INTERNATIONAL BUSINESS MACHINES CORPORATION, Armonk, NY (US)

(72) Inventors: Richard Gorzela, Andover, MA (US); Asima Silva, Holden, MA (US); Jaime M. Stockton, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/426,394

(22) Filed: Feb. 7, 2017

(65) Prior Publication Data

US 2018/0226070 A1    Aug. 9, 2018

(51) Int. Cl.
*G10L 15/00*    (2013.01)
*G06F 16/432*    (2019.01)
(Continued)

(52) U.S. Cl.
CPC ....... *G06F 16/433* (2019.01); *G06K 9/00302* (2013.01); *G10L 15/1822* (2013.01);
(Continued)

(58) Field of Classification Search
CPC ..... G10L 15/1815; G10L 25/90; G10L 15/22; G10L 25/63; G10L 15/02; G10L 15/07;
(Continued)

(56) References Cited

U.S. PATENT DOCUMENTS 6,904,408 B1    6/2005 McCarthy et al.
8,495,503 B2    7/2013 Brown et al.
(Continued)

OTHER PUBLICATIONS

Anonymous, "Method and System for Resolving Communication Conflicts," An IP.com Prior Art Database Technical Disclosure, Nov. 4, 2016, p. 1-2, IP.com No. IPCOM000248180D.

(Continued)

*Primary Examiner* — Vu B Hang
(74) *Attorney, Agent, or Firm* — L. Jeffrey Kelly

(57) ABSTRACT

Embodiments of the present invention disclose a method, computer system, and a computer program product for mitigating conflicts. The present invention may include receiving communication by a recipient, wherein the received communication has a communicator sentiment associated with a communicator and a recipient sentiment associated with a recipient. The present invention may also include determining the communicator sentiment associated with the communicator message. The present invention may then include determining the recipient sentiment associated with a received communicator message. The present invention may further include determining that the determined recipient sentiment does not match the determined communicator sentiment based on the received communication. The present invention may include determining an appropriate response based on determining that the communicator sentiment does not match the recipient sentiment. The present invention may include presenting the determined appropriate response. The present invention may include logging a conversation result in a database.

20 Claims, 6 Drawing Sheets

(51) Int. Cl.
*G06K 9/00* (2006.01)
*G10L 25/63* (2013.01)
*H04L 12/58* (2006.01)
*G10L 15/18* (2013.01)
*G10L 15/183* (2013.01)
*G10L 15/22* (2006.01)
*G10L 15/02* (2006.01)

(52) U.S. Cl.
CPC .............. *G10L 25/63* (2013.01); *H04L 51/32* (2013.01); *G10L 15/02* (2013.01); *G10L 15/183* (2013.01); *G10L 15/22* (2013.01)

(58) Field of Classification Search
CPC ......... G10L 15/08; G10L 15/20; G10L 15/26; G10L 15/1822; G10L 15/183; G10L 15/30; G10L 13/043; G10L 17/26; G06F 17/30026; G06F 16/433; G06K 9/00302; H04L 51/04; H04L 51/32
See application file for complete search history.

(56) References Cited

U.S. PATENT DOCUMENTS

| | | | | |
|---|---|---|---|---|
| 9,191,513 | B1* | 11/2015 | Ramkumar | ......... H04M 3/5233 |
| 9,282,066 | B2 | 3/2016 | Chakra et al. | |
| 9,380,010 | B2* | 6/2016 | Bastide | ................. G06F 16/245 |
| 9,646,198 | B2* | 5/2017 | Cunico | ................. H04N 7/147 |
| 9,812,151 | B1 | 11/2017 | Amini et al. | |
| 2005/0112535 | A1 | 5/2005 | McIntosh | |
| 2010/0055655 | A1 | 3/2010 | Ashman, Jr. | |
| 2013/0129076 | A1* | 5/2013 | Kannan | ............... H04M 3/5175 379/265.09 |
| 2014/0112556 | A1* | 4/2014 | Kalinli-Akbacak | .... G10L 25/63 382/128 |
| 2014/0220526 | A1 | 8/2014 | Sylves | |
| 2014/0254775 | A1* | 9/2014 | O'Connor | ........... H04M 3/5175 379/68 |
| 2015/0195406 | A1* | 7/2015 | Dwyer | ................ H04M 3/5175 379/265.07 |
| 2015/0347919 | A1* | 12/2015 | Bastide | ................. G06F 16/245 706/52 |
| 2016/0019402 | A1 | 1/2016 | Khandelwal | |
| 2016/0127557 | A1* | 5/2016 | McCormack | ......... G06F 16/955 379/265.12 |
| 2016/0147731 | A1* | 5/2016 | Parikh | .................. G06F 17/276 715/261 |
| 2018/0032126 | A1* | 2/2018 | Liu | ........................ G06F 3/011 |
| 2018/0181561 | A1* | 6/2018 | Raanani | ............. G06F 17/2785 |
| 2018/0234382 | A1* | 8/2018 | Cunico | .................. H04L 51/34 |

OTHER PUBLICATIONS

Mell et al., "The NIST Definition of Cloud Computing," National Institute of Standards and Technology, Sep. 2011, p. 1-3, Special Publication 800-145.

IBM, "List of IBM Patents or Patent Applications Treated as Related (Appendix P)," Feb. 6, 2018, p. 1-2.

Gorzela et al., "Real-Time Conflict Mitigator," Application and Drawings, Filed on Sep. 11, 2017, 32 Pages, U.S. Appl. No. 15/700,250.

* cited by examiner

REAL-TIME SENTIMENT ANALYSIS FOR CONFLICT MITIGATION USING COGNATIVE ANALYTICS AND IDENTIFIERS

BACKGROUND

The present invention relates generally to the field of computing, and more particularly to conflict mitigation.

Sometimes communication between people can break down and leave participants confused as to why they are receiving a reaction they did not anticipate. Even well worded expressions may carry a tone that can negatively impact the recipient. The causes may be that the communicator could have difficulty reading others or have a reduced focus due to stress factors. Another level of communication breakdown can happen even if the communicator does understand the negative impact of their message. A breakdown may occur if the communicator does not know how to respond to the recipient who received the communication negatively. Further, the recipient may also not know how to respond to the negatively received message, which can lead to a degraded conversation and an untrusting relationship.

SUMMARY

Embodiments of the present invention disclose a method, computer system, and a computer program product for mitigating conflicts. The present invention may include receiving communication by a recipient, wherein the received communication has a communicator sentiment associated with a communicator and a recipient sentiment associated with a recipient. The present invention may also include determining the communicator sentiment associated with the communicator message. The present invention may then include determining the recipient sentiment associated with a received communicator message. The present invention may further include determining that the determined recipient sentiment does not match the determined communicator sentiment based on the received communication. The present invention may also include determining an appropriate response based on determining that the communicator sentiment does not match the recipient sentiment. The present invention may then include presenting the determined appropriate response. The present invention may further include logging a conversation result in a database.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
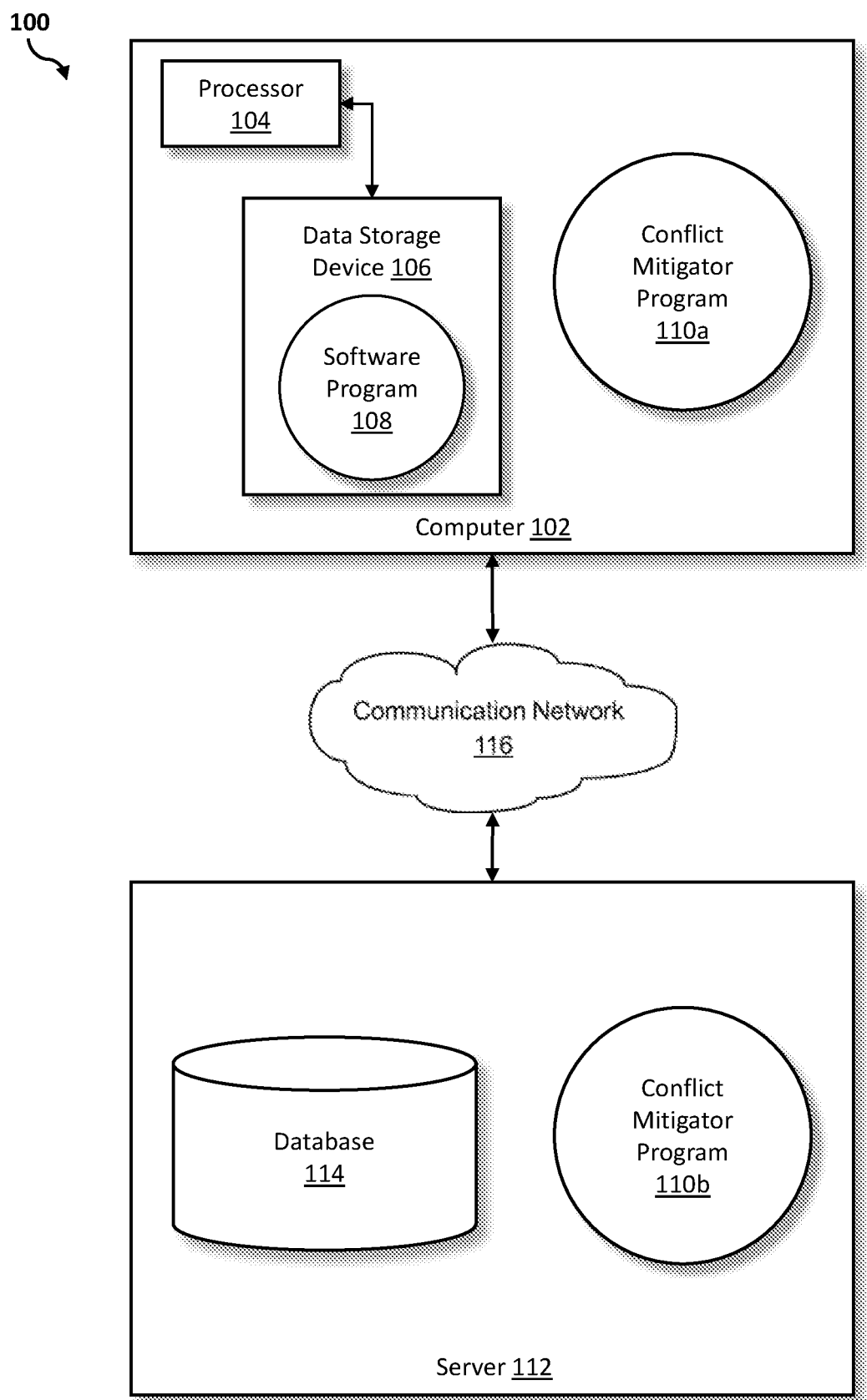
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for conflict mitigation. As such, the present embodiment has the capacity to improve the technical field of conflict mitigation by providing real-time response feedback during a conversation that may lead to more conversations with positive results. More specifically, the conflict mitigator program may analyze each person's facial expressions, tone of speech and biometric responses during a real-time conversation in real-time in order to provide positive real-time responses to negative reactions. The real-time responses may be provided to an individual through a message which may be typed on a computing device screen or verbally communicated via a computing device speaker or headphones. The positive responses, provided by the conflict mitigator program, to negative reactions during communications between individuals may foster better and more trusting relationships between parties. A conflict mitigator program may provide real-time feedback for communicators and recipients in the event that there may be a misunderstanding or a mismatch between the recipients internal response and the intent of the communicator.

As described previously, sometimes communication between people can break down and leave participants confused as to why they are receiving a reaction they did not anticipate. Even well worded expressions may carry a tone that can negatively impact the recipient. The causes may be that the communicator could have difficulty reading others or have a reduced focus due to stress factors. Another level of communication breakdown can happen even if the communicator does understand the negative impact of their message. A breakdown may occur if the communicator does not know how to respond to the recipient who received the communication negatively. Further, the recipient may also not know how to respond to the negatively received message, which can lead to a degraded conversation and an untrusting relationship.

Examples of communicators and recipients may include a doctor and patient relationship, a bully and victim situation, an assisted living support worker and an assisted living resident relationship, a parent and child relationship, or between spouses. A misunderstanding and a proper real-time response may help the individuals in any of the previously mentioned relationships, or any other kind of communicating situation, understand one another and get a more positive result out of the interaction. A better, more positive response and result may lead to stronger relationships and a better understanding between the communicator and the recipient. Assessing sentiment and emotions through voice identifiers, facial expression identifiers and biometric identifiers may assist in understanding how a message is communicated and how a message is received. Therefore, it may be advantageous to, among other things, provide a way to offer real-time feedback to both the communicator and the recipient while providing each with a more positive response in order to foster better relationships.

The conflict mitigator program may identify personalities of communicators and recipients and during a conversation may compare the real-time interaction with previous interactions between the same parties. The comparison may identify differences in previous reactions or consistencies in previous reactions whether the reactions are positive or negative. The conflict mitigator program may have a response component that provides the parties with real-time feedback on how a message could have been worded better based on similar conversations that had positive emotive results, personalities of the parties and a history of interactions between the parties.

A personality example that the conflict mitigator program may take into consideration is someone who has difficulty with presenting constructive criticism and may need specific advice specific to that person's task. Alternatively, someone who does not handle criticism well might need specific advice on how to respond to criticism. An example of a history of interactions between parties may include a manager who consistently gets negative reactions from specific team members when giving direction. The manager may need feedback on how to solicit the team members advice before giving direction.

The conflict mitigator program may provide an individual with specific recommendations for better and more positively phrased real-time communication responses based on real-time communication with another person. The conflict mitigator program may provide real-time responses to individuals by using a cognitive analyzer to analyze both the communicator's and the recipient's tone, biometrics, facial expressions and sentiment. The tone identifier and the facial expression identifier may take data from the communicator while capturing the recipient's facial expression and biometric response. Upon receiving data in the form of communication tone, biometrics and facial expressions between two or more parties, the conflict mitigator program may use the currently received data along with the personalities involved and a history of reactions between the parties to identify exemplar conversations.

The cognitive analyzer component of the conflict mitigator program may compare data in order to provide a more positive conversational response by using a database that provides similar and more successful conversational responses. The cognitive analyzer may provide comparisons of conversations that have happened in the past with the current conversation. The response feature may provide the communicator and the receiver of the communication with a better real-time response (e.g., feedback) during the conversation.

The conflict mitigator program may provide the person that delivered a negatively received message with an alternative message based on similar but more positive resulting conversations, specific personalities involved and the history of interactions between the parties. Similarly, the conflict mitigator program may also provide the person who received a message that they reacted to in a negative way with a positive response based on similar criteria. When providing a response, the conflict mitigator program may remove identifying data (e.g., individual's names, locations, etc.) so that the better worded responses may provide positive responses without presenting information to the parties (e.g., personality types, history of interactions, etc.). While the conflict mitigator program may analyze personality types and a history of interactions, the information may not be provided in specific responses to communicators and recipients. The conflict mitigator program may be used and be beneficial for first instances of conversations between more than one person and with already developed relationships where the individuals have communicated in multiple instances.

One scenario of how the conflict mitigator program may foster a better relationship may be amongst co-workers, for example, Party A often tells jokes about a specific professional group to co-worker Party B. Party A thinks his jokes are funny and help to put people in a good mood in the morning, however, Party A does not know that Party B's spouse is in the specific professional group that Party A jokes about. The conflict mitigator program may detect Party B's increasing annoyance through facial expressions and tone and the conflict mitigator program may then recommend that Party A try a different small talk subject such as sports. Sports may be a topic chosen by the conflict mitigator program if there is a history of positive results amongst co-workers having a positive response to sports talk.

Another scenario of how the conflict mitigator program may foster a more trusting relationship may be between a doctor and a patient, for example when a doctor reviews test data with a patient after only one previous meeting between the two. The doctor had ordered blood tests and an ultrasound since the initial physical examination proved inconclusive. The patient is 18 years old and this is the first medical encounter with a doctor other than the patient's pediatrician. The patient is apprehensive to receive the results of the blood tests and the ultrasound since the patient has not previously had any serious conditions. Another apprehension the patient has is that the patient's pediatrician was friendly and was only visited for an occasional cold or sports related abrasions. During the follow-up appointment, the doctor explains to the young patient that the tests were inconclusive so a biopsy or surgery may be necessary. Although the doctor also explains that the patient should wait a month for a re-examination before getting a biopsy or surgery, the words surgery and inconclusive have already made the patient concerned. The 18-year-old patient does not understand what a biopsy is and surgery sounds scary so all the patient can muster up in a response is to say "ok."

The conflict mitigator program may identify the patient's heightened tension through facial expression analysis and biometrics while the doctor's tone is analyzed as confident and even tempered. The conflict mitigator program identifies a misunderstanding (i.e., a mismatch) based on the patient's reaction to the doctor's words. The cognitive analyzer component of the program may compare the mismatch and find similar conversations between a doctor and a younger, more inexperienced, patient from a database where the doctor had to deliver news regarding a continuing diagnosis. The conflict mitigator program may then provide a real-time recommendation to the doctor to slow down and explain the terms to the new patient. Another provided real-time recommendation for the doctor's response may be an adjustment in the phrasing of the information to "While we may determine the need for some further tests, we are confident that the best next step is for you to first come back in a month for a re-examination to see how things many have changed." The conflict mitigator program may also provide the patient with recommendations, such as to ask for clarification of the terms that were not understood and recommend the patient say "Doctor, please explain what a 'biopsy' is and how it is used?"

Another scenario of how the conflict mitigator program may foster a more trusting relationship may be between an employee and a resident of an assisted living facility, for example in a situation where an assisted living resident has resided at a facility for a year. The resident does not like physical contact and a newer employee of the facility likes to give friendly hugs when greeting people. The quick affection from the newer employee to the resident may cause the resident to be apprehensive and react negatively to the employee even though the employee believes they are being friendly.

The conflict mitigator program may identify the resident's apprehension when interacting with the friendly employee through biometrics and facial expression analysis. The conflict mitigator program may also identify the employee's joyful sentiment and openness which would create a misunderstanding (i.e., a mismatch) with the resident's reaction. The conflict mitigator program may then search a database to find similar scenarios and provide a recommendation of alternative real-time responses. An alternative real-time response for the employee may be to ask the resident permission before doing anything physical such as giving the resident a hug. Further, the conflict mitigator program may recommend that the resident state more directly to the employee about what kind of interaction is preferred.

The conflict mitigator program in the above stated examples may generate a real-time response by analyzing past behavior and by analyzing other similarly situated conversation environments. The conflict mitigator program may recognize that even if the communicators are prepared for a conversation, that face-to-face communication may still lead to misunderstandings that are specific to the parties involved and may provide guidance to the communicators in real-time. If there is a mismatch in sentiment during the conversation, the conflict mitigator program may notice that one person may be upset while the other is demonstrating positive characteristics such as joy or empathy. A real-time response may provide the communicators with similar conversations that had more positive results where the participants did not have a negative mood, were not in a heightened response and showed positive sentiments such as empathy, confidence, joy and/or openness. Previous similar conversations that the conflict mitigator program uses may be between the two parties conversing which had positive emotive results or between two different parties which had positive emotive results.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a conflict mitigator program 110a. The networked computer environment 100 may also include a server 112 that is enabled to run a conflict mitigator program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the conflict mitigator program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the conflict mitigator program 110a, 110b (respectively) to obtain real-time responses to communication with another person where a misunderstanding may be present. The conflict mitigator method is explained in more detail below with respect to FIGS. 2 and 3.

Figure 2:
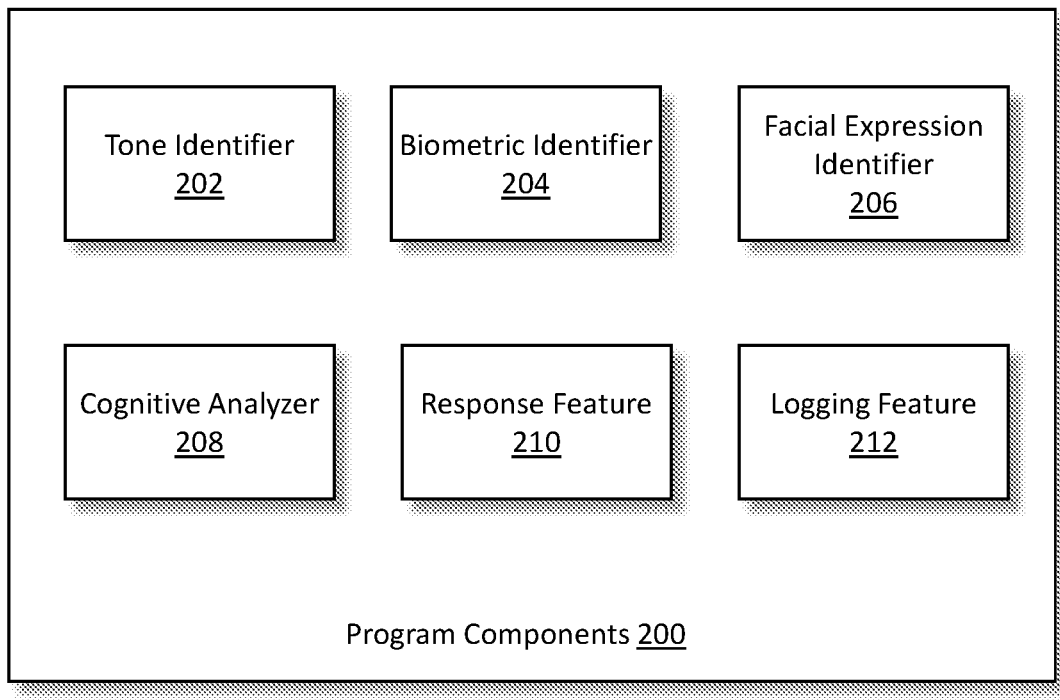
FIG. 2 is a block diagram of the conflict mitigator program components according to at least one embodiment.

Referring now to FIG. 2, a block diagram of the conflict mitigator program components according to at least one embodiment is depicted. The program components 200 may include identifier components such as a tone identifier 202, a biometric identifier 204 and a facial expression identifier 206. The program components 200 may also include a cognitive analyzer 208, a response feature 210 and a logging feature 212.

The tone identifier 202 may analyze the sentiment in the communicator's tone of voice (e.g., volume, inflection, sharpness, softness, etc.). The tone identifier 202 may also identify the tone of a digital message by analyzing the words written with other symbols and the use of capital letters. The biometric identifier 204 may measure heightened responses (e.g., changes in blood pressure, heart rate, breathing, pupil dilation, body temperature, etc.). The facial expression identifier 206 may recognize emotions (e.g., joy, fear, duress, anger, etc.).

The cognitive analyzer 208 may use computing technology (e.g., Watson Analytics™, Watson Analytics and all Watson Analytics-based trademarks and logos are trademarks or registered trademarks of International Business Machines Corporation and/or its affiliates) to analyze the tone identifiers 202, biometric identifiers 204, and facial expression identifiers 206 that have been inputted into the conflict mitigator program 110a, 110b. The cognitive analyzer 208 may analyze the personalities of the communicator and the recipient, the history of reactions between the personalities (e.g., positive or negative reactions) and may identify exemplary conversations that relate to the same subject that is being conversed. The cognitive analyzer 208 may detect patterns of conversations and reactions made by an individual. For example, whether a doctor has had consistent negative or positive responses from the nurse staff. This data may be useful to both the doctor to know how best to talk to co-workers and for the hospital to be able to track the doctor's effectiveness in communicating.

The response feature 210 may provide real-time feedback (e.g., through headphones, speakers, text, type written message, etc.) for both the communicator and the recipient based on the cognitive analyzer's identification of exemplar conversations. The response feature 210 may provide both parties with real-time feedback that may be more positive in nature and that might defuse any situation (e.g., alternative reactions and message phrasing). Further, the response feature 210 may also allow the communicators to build trust by communicating through any misunderstandings in real-time. The logging feature 212 may log the tone identifiers 202, biometric identifiers 204, facial expression identifiers 206, cognitive analysis and real-time response to capture the history of conversations and reactions between communicators for use in the present conversation or use in a future conversation. The conflict mitigator program 110a, 110b may use a database 114 to store the communications between communicators, the reactions and resolutions. The database 114 may provide better responses (i.e., feedback) as the database obtains more data to pull from. For example, the more conversations and reactions that are added to the database 114 (e.g., Watson) may create more data for the conflict mitigator program 110a, 110b to use when providing real-time feedback to communicators.

Figure 3:
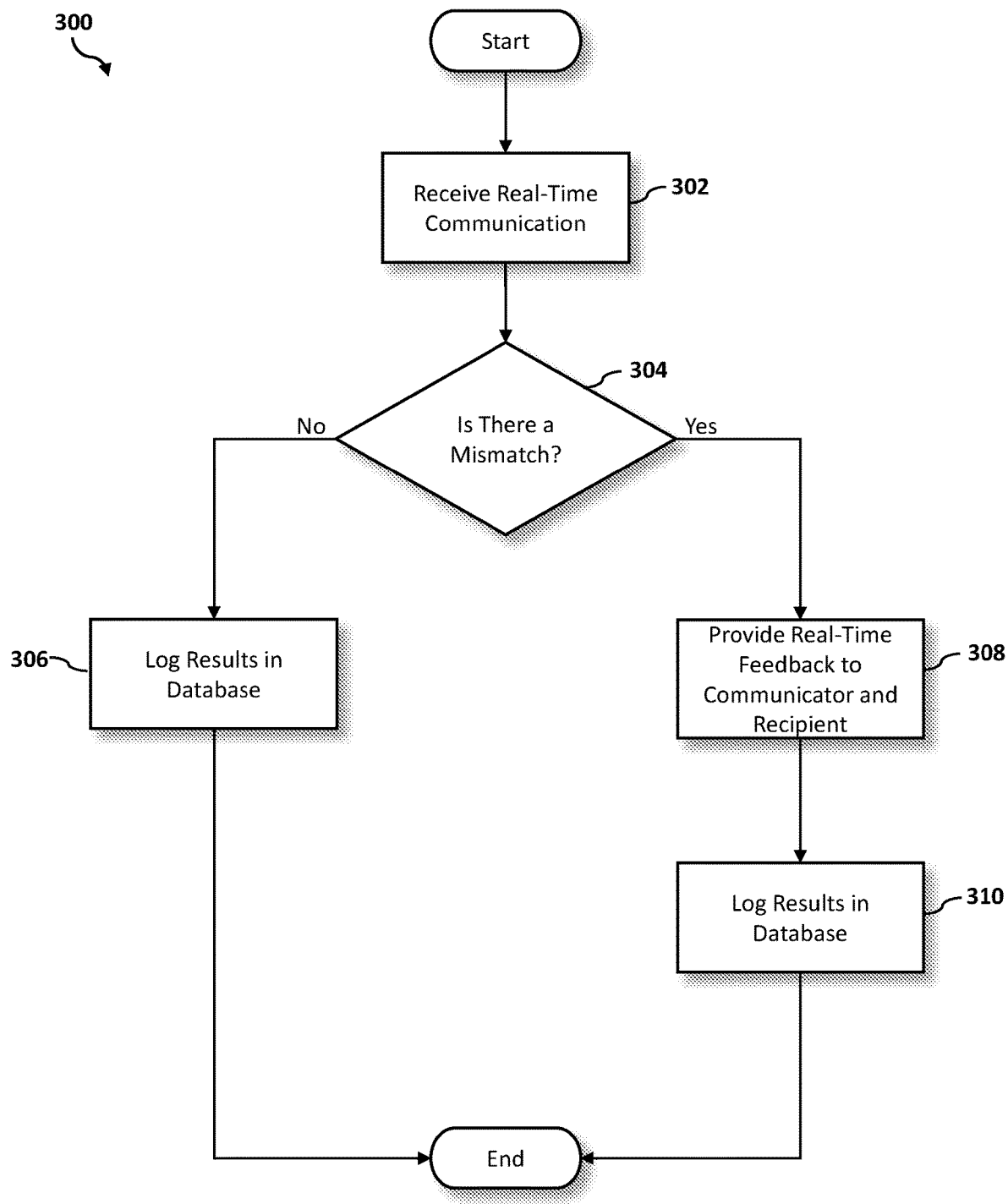
FIG. 3 is an operational flowchart illustrating a process for conflict mitigating according to at least one embodiment.

Referring now to FIG. 3, an operational flowchart illustrating the exemplary real-time conflict mitigator process 300 used by the conflict mitigator program 110a, 110b according to at least one embodiment is depicted.

At 302, the conflict mitigator program 110a, 110b receives real-time communication. The communication may be received either verbally or type-written. When the communicator speaks, or sends a message, both the recipient and the conflict mitigator program 110a, 110b receive the verbal or type-written message. The conflict mitigator program 110a, 110b may receive communication from any individual during a conversation. Verbal communication may be captured using a microphone on a device in an audio file format (e.g., .mp3 and .wav formats). The audio file may be filed in a data repository as an audio message. The type-written communication (i.e., type-written message) may be captured from an email or a text message and may be filed in a data repository.

Then at 304, the conflict mitigator program 110a, 110b determines if there is a mismatch in communication between the sender and the recipient. A mismatch may be a misunderstanding between the people conversing. A mismatch may occur when the intent of the communicator does not match the resulting emotional response of the recipient. The mismatch may even occur in the form of body contact such as a hug, as presented in the previous example between the employee and the assisted living facility resident. An example of a communication misunderstanding may occur if the communicator makes a statement or asks a question with good intentions and the statement is met with a response from the recipient that is upset, sad or angry. Good intentions may be measured by the communicator's tone of voice, facial expression features and biometric features. Similarly, the recipient's opposite response of sadness or anger may be measured by tone of voice, facial expression features and biometric features. An example of good intentions may show an even-level heart rate while anger may show an elevated heart rate.

The tone of voice feature may be captured by a microphone input into a digital audio file format and the conflict mitigator program 110a, 110b may identify certain patterns and compare the patterns with known patterns of tone of voice associated with positive and negative reactions. For example, a softer and even tone may convey a calm and nice tone of voice while a sharp and loud tone may convey an angry tone of voice. Facial expression features may be captured through a camera sensor and the conflict mitigator program 110a, 110b may conduct an image analysis or pattern matching, or both image analysis and pattern matching, to identify facial features associated with positive and negative reactions. For example, a smile may show a positive facial feature while furrowed eyebrows may convey a negative or confused facial feature. The biometric feature may use known technology to capture body reactions (e.g., body heat, blood flow, heart rate/pulse, dilated pupils, etc.) to comments or physical contact. For example, a LED (light-emitting diode) light may be shined from a device worn on the wrist onto the wrist to detect changes in blood flow. For example, a sharp rise in blood flow during a conversation may convey a more negative reaction.

The mismatch may be recognized by the conflict mitigator program 110a, 110b by noticing, for example, that the communicator's intent was good, however, the recipient had a negative response to the comment made by the communicator. The tone identifiers 202, biometric identifiers 204 and facial feature identifiers 206 may identify the communicator is positively communicating with good intent through a nice tone, regular heartrate and joyful facial features. The recipient may provide tone identifiers 202, biometric identifiers 204 and facial expression identifiers 206 to show a negative reaction by body temperature rising, facial features that represent a stressful emotion and a distressed tone of voice in a response. This mismatch (e.g., misunderstanding) will cause the conflict mitigator program 110a, 110b to search a positive response database (e.g., database 114) containing positive responses for better responses to provide for each party to use. The communicator may be presented with real-time feedback to reword the comment while the recipient may be presented with real-time feedback to ask the communicator to clarify what they meant.

For example, a doctor communicates to a young patient that the results to the tests that were run were inconclusive, a biopsy may be needed next month and surgery may follow. The young patient does not fully understand what is being communicated and gets scared of the word biopsy and the word surgery. An older patient in this scenario might not react negatively to this communication from the doctor because an older patient would most likely understand what the doctor is saying. The younger patient, however, does not know what a biopsy is and is frightened at the thought of surgery because the young patient has not been to a doctor for more than a common cold. Therefore, the doctor's good intent with empathetic emotions while communicating to the patient is a mismatch with the patients resulting fear.

If the conflict mitigator program 110a, 110b determined that there is not a mismatch in communication between the communicator and the recipient at 304, then the conflict mitigator program 110a, 110b will log the results in a database (e.g., database 114) at 306. If no mismatch in the tone identifiers 202, biometric identifiers 204, and facial feature identifier 206 between the communicator's intent and the recipient's reaction is present, then the conflict mitigator program 110a, 110b may not need to provide any real-time response to parties in the conversation. The conversation may be saved in a database 114 to be marked as successful and the data from the conversation may be used to make the cognitive analyzer 208 component more robust with potential positive responses. For example, if a doctor provides test results to a young patient who understood what the doctor was saying, and the young patient provided positive tone identifiers 202, biometric identifiers 204 and facial expression identifiers 206, then the details of the conversation may be used for a doctor in a similar situation but in an instance where the young patient reacted negatively to the conversation.

If the conflict mitigator program 110a, 110b determined that there is a mismatch in communication between the communicator and the recipient at 304, then the conflict mitigator program 110a, 110b will provide real-time feedback to both the communicator and the recipient at 308. The conflict mitigator program 110a, 110b provides real-time feedback for communicators and recipients in the event that there may be a misunderstanding or a mismatch between the recipients internal response and the intent of the communicator. Responses may be in the form of a message on a screen, a voice played through speakers, or through headphones. Responses may also be a combination of an audio message and a type-written message. Real-time feedback may turn negative conversations into positive conversations that yield stronger and more trusting relationships. The real-time component of the conflict mitigator program 110a, 110b allows the conversation to be corrected instantly while the conversation is happening. A person could go from having bad feelings associated with a person or conversation in the beginning of conversing to later walking away with good feelings associated with the same person or conversation. The real-time component of the conflict mitigator program 110a, 110b may create a more positive environment where the people communicating may get more value and feel better after having the conversation.

Continuing from the previous example, since there is a mismatch between the doctor's intent of communication and the patient's emotional response to the communication, the conflict mitigator program 110a, 110b may provide real-time responses to both the doctor and the patient. Real-time feedback for the doctor may tell the doctor to explain what a biopsy is to the patient and that nothing further needs to be done between now and the next checkup in a month when more information will be available after more tests are run. The conflict mitigator program 110a, 110b may provide real-time feedback for the doctor by searching for similar conversations between doctors and young patients in the positive response database (e.g., database 114), which may be more explanatory in nature by providing definitions to words that an older patient may already know. Alternatively, the conflict mitigator program 110a, 110b may provide real-time feedback for the patient to ask the doctor to explain what a biopsy is. Through the dialog that may come from the conflict mitigator program's 110a, 110b real-time feedback component, the doctor may earn the trust of the patient and the patient may walk away from the doctor appointment without fear. This more positive interaction may foster better trust and relationships.

Then at 310, the conflict mitigator program 110a, 110b will log the results in a database 114. The results are logged into a database 114 as stated above at 306. The log may continually collect data and continually grow, providing more responses to more types of situations thereby increasing the effectiveness of the conflict mitigator program 110a, 110b over time.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements. An alternate embodiment may be where one party receives recommended (i.e., appropriate) responses from the conflict mitigator program 110a, 110b. For example, if the communicator has a device running the conflict mitigator program 110a, 110b, and was speaking to a recipient who did not have a device running the conflict mitigator program 110a, 110b, then the communicator's device may provide the communicator with proper responses based on sentiment analysis of both the communicator and the recipient.

Figure 4:
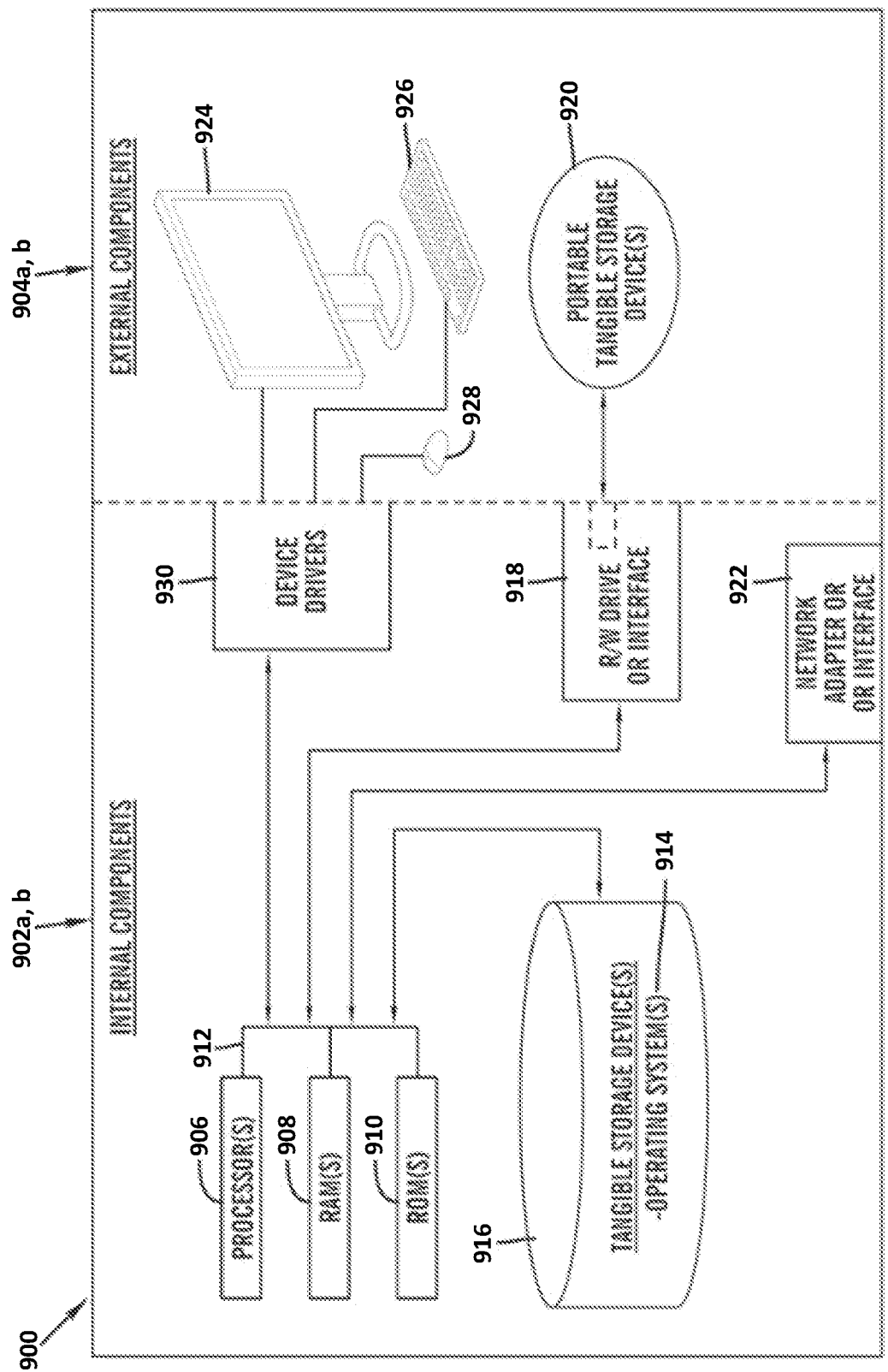
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the conflict mitigator program 110a in client computer 102, and the conflict mitigator program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the conflict mitigator program 110a, 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the conflict mitigator program 110a in client computer 102 and the conflict mitigator program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the conflict mitigator program 110a in client computer 102 and the conflict mitigator program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
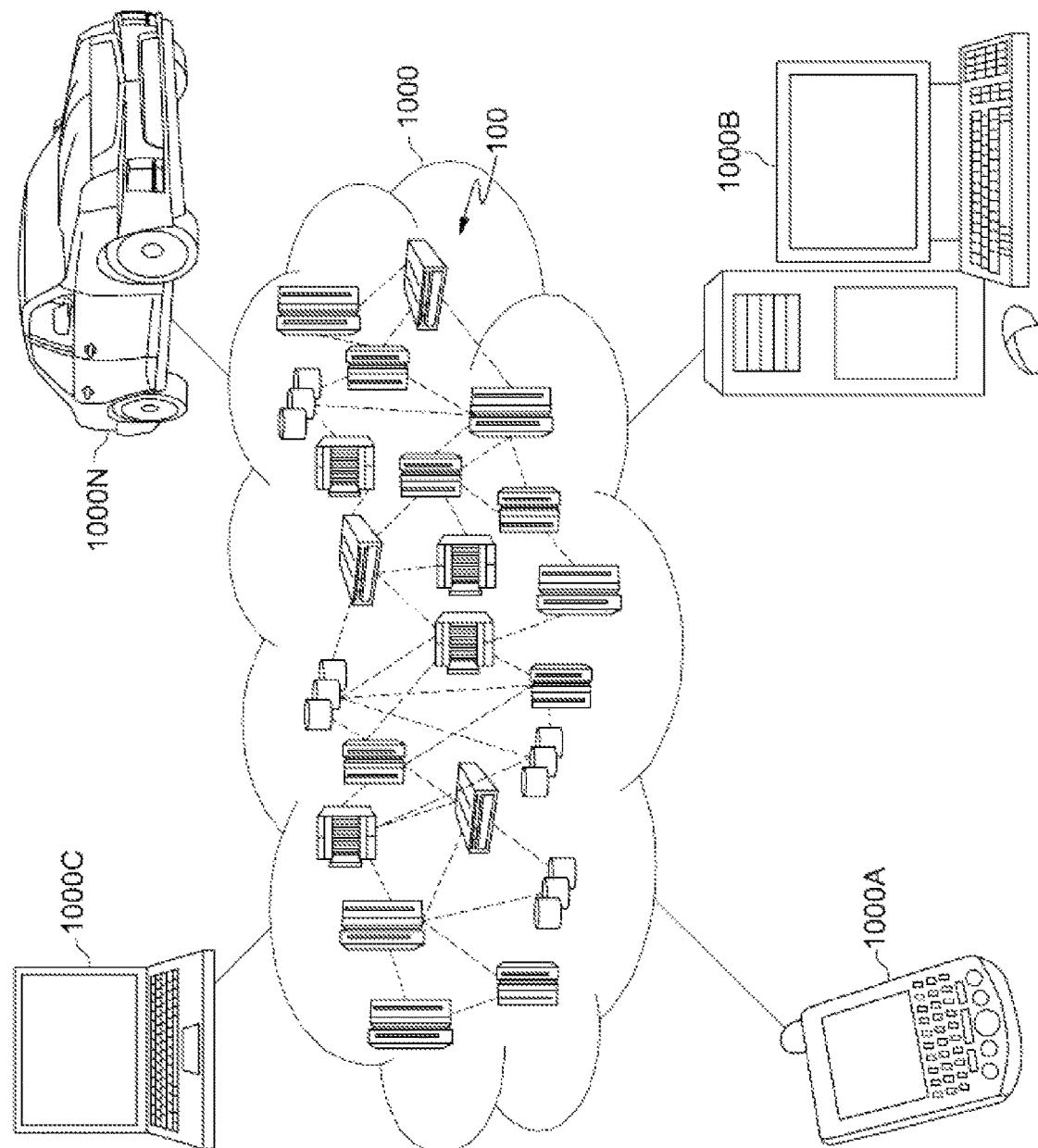
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
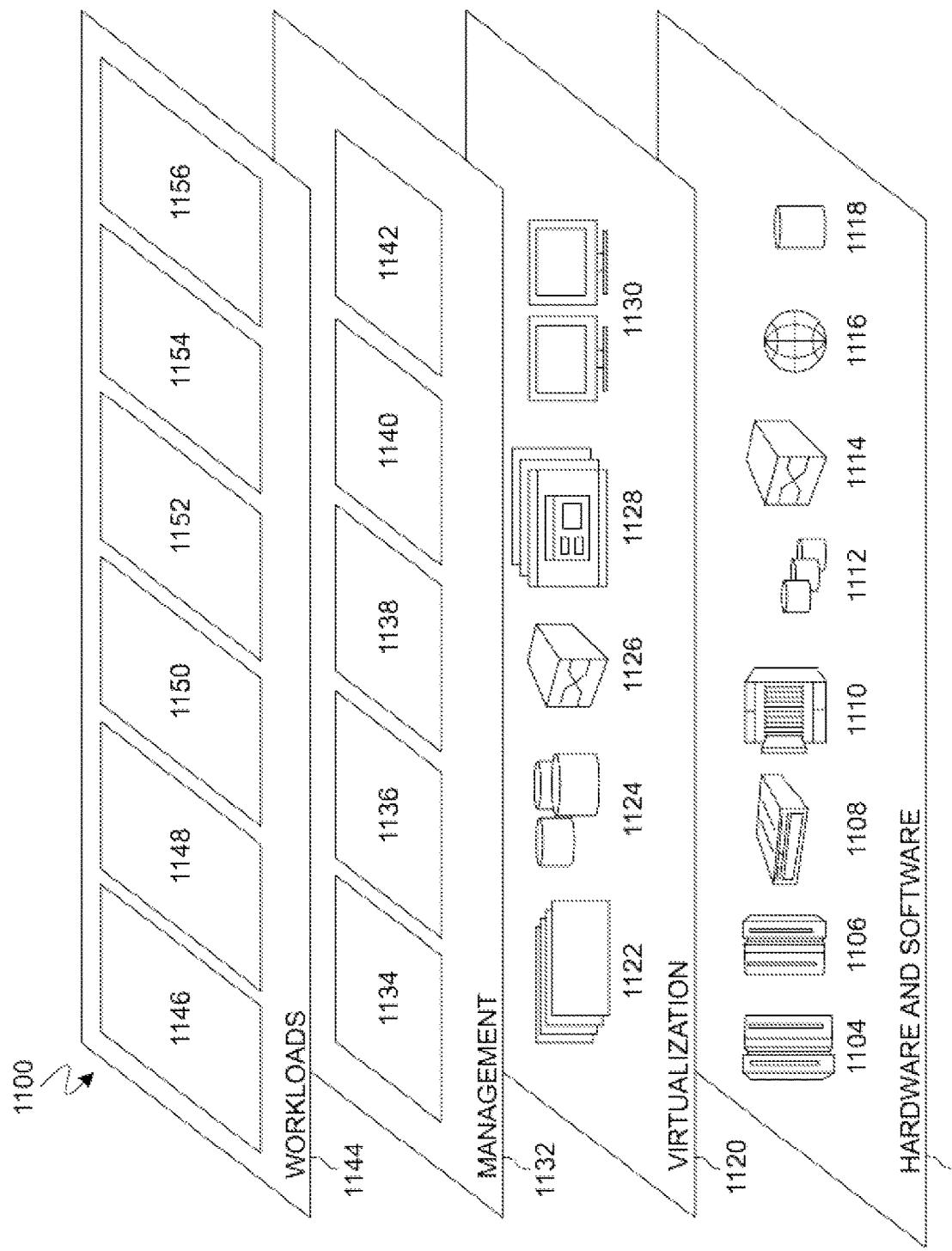
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and conflict mitigation 1156. A conflict mitigator program 110a, 110b provides real-time feedback for communicators and recipients in the event that there may be a misunderstanding or a mismatch between the recipients internal response and the intent of the communicator.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for mitigating conflicts, the method comprising:
   receiving a first communication by a first person operating a first computing device;
   receiving a second communication by a second person operating a second computing device, wherein the first person and the second person are in a face-to-face conversation, wherein the first computing device and the second computing device each have a camera, a microphone and a sensor to measure a plurality of identifiers, wherein the plurality of identifiers include facial features, voice features and biometric features;
   determining the received first communication has a first sentiment associated with the first person and a second sentiment associated with the second person, wherein the second sentiment is in response to the first communication, wherein the first sentiment and the second sentiment are measured by the plurality of identifiers, wherein the plurality of identifiers for the first sentiment and the second sentiment are analyzed by a cognitive analyzer, wherein the cognitive analyzer compares the received measurements, historical data and personality;
   determining that the first sentiment does not match the second sentiment, wherein the determination is made based on the cognitive analyzer's measurements and analysis between the first person and the second person;
   retrieving successful conversational responses from a database of a similar topic as the first communication and the second communication;
   providing a response to the first person on the first computing device and the second person on the second computing device, wherein the response is created to align the sentiment between the first person and the second person towards a matching sentiment; and
   logging a conversation result in a database.

2. The method of claim 1, wherein the determined first person sentiment and the determined second person sentiment are measured by a plurality of tone identifiers.

3. The method of claim 1, wherein the determined first person sentiment and the determined second person sentiment are measured by a plurality of biometric identifiers.

4. The method of claim 1, wherein the determined first person sentiment and the determined second person sentiment are measured by a plurality of facial expression identifiers.

5. The method of claim 1, wherein the provided response includes delivering a message selected from a group consisting of an audio message, a type-written message, and a combination audio message and type-written message.

6. The method of claim 1, wherein the provided response is obtained from a positive response database, wherein the positive response database accumulates a plurality of logged conversation responses.

7. The method of claim 1, wherein the provided response includes presenting the determined recommended response to the first person and the second person.

8. A computer system for mitigating conflicts, comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a first communication by a first person operating a first computing device;
receiving a second communication by a second person operating a second computing device, wherein the first person and the second person are in a face-to-face conversation, wherein the first computing device and the second computing device each have a camera, a microphone and a sensor to measure a plurality of identifiers, wherein the plurality of identifiers include facial features, voice features and biometric features;
determining the received first communication has a first sentiment associated with the first person and a second sentiment associated with the second person, wherein the second sentiment is in response to the first communication, wherein the first sentiment and the second sentiment are measured by the plurality of identifiers, wherein the plurality of identifiers for the first sentiment and the second sentiment are analyzed by a cognitive analyzer, wherein the cognitive analyzer compares the received measurements, historical data and personality;
determining that the first sentiment does not match the second sentiment, wherein the determination is made based on the cognitive analyzer's measurements and analysis between the first person and the second person;
retrieving successful conversational responses from a database of a similar topic as the first communication and the second communication;
providing a response to the first person on the first computing device and the second person on the second computing device, wherein the response is created to align the sentiment between the first person and the second person towards a matching sentiment; and
logging a conversation result in a database.

9. The computer system of claim 8, wherein the determined first person sentiment and the determined second person sentiment are measured by a plurality of tone identifiers.

10. The computer system of claim 8, wherein the determined first person sentiment and the determined second person sentiment are measured by a plurality of biometric identifiers.

11. The computer system of claim 8, wherein the determined first person sentiment and the determined second person sentiment are measured by a plurality of facial expression identifiers.

12. The computer system of claim 8, wherein the provided response includes delivering a message selected from a group consisting of an audio message, a type-written message, and a combination audio message and type-written message.

13. The computer system of claim 8, wherein the provided response is obtained from a positive response database, wherein the positive response database accumulates a plurality of logged conversation responses.

14. The computer system of claim 8, wherein the provided response includes presenting the determined recommended response to the first person and the second person.

15. A computer program product for mitigating conflicts, comprising:
one or more computer-readable tangible storage medium and program instructions stored on at least one of the one or more computer-readable tangible storage medium, the program instructions executable by a processor, the program instructions comprising:
program instructions to receive a first communication by a first person operating a first computing device;
program instructions to receive a second communication by a second person operating a second computing device, wherein the first person and the second person are in a face-to-face conversation, wherein the first computing device and the second computing device each have a camera, a microphone and a sensor to measure a plurality of identifiers, wherein the plurality of identifiers include facial features, voice features and biometric features;
program instructions to determine the received first communication has a first sentiment associated with the first person and a second sentiment associated with the second person, wherein the second sentiment is in response to the first communication, wherein the first sentiment and the second sentiment are measured by the plurality of identifiers, wherein the plurality of identifiers for the first sentiment and the second sentiment are analyzed by a cognitive analyzer, wherein the cognitive analyzer compares the received measurements, historical data and personality;
program instructions to determine that the first sentiment does not match the second sentiment, wherein the determination is made based on the cognitive analyzer's measurements and analysis between the first person and the second person;
program instructions to retrieve successful conversational responses from a database of a similar topic as the first communication and the second communication;
program instructions to provide a response to the first person on the first computing device and the second person on the second computing device, wherein the response is created to align the sentiment between the first person and the second person towards a matching sentiment; and
program instructions to log a conversation result in a database.

16. The computer program product of claim 15, wherein the determined first person sentiment and the determined second person sentiment are measured by a plurality of tone identifiers.

17. The computer program product of claim 15, wherein the determined first person sentiment and the determined second person sentiment are measured by a plurality of biometric identifiers.

18. The computer program product of claim 15, wherein the determined first person sentiment and the determined second person sentiment are measured by a plurality of facial expression identifiers.

19. The computer program product of claim 15, wherein the provided response includes delivering a message selected from a group consisting of an audio message, a type-written message, and a combination audio message and type-written message.

20. The computer program product of claim 15, wherein the provided response is obtained from a positive response database, wherein the positive response database accumulates a plurality of logged conversation responses.

\* \* \* \* \*